United States Patent
Elms et al.

(10) Patent No.: US 7,359,168 B2
(45) Date of Patent: Apr. 15, 2008

(54) ARC FAULT CIRCUIT INTERRUPTER AND METHOD FOR DISABLING SERIES ARC PROTECTION DURING CURRENT TRANSIENTS

(75) Inventors: Robert T. Elms, Monroeville, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 80 days.

(21) Appl. No.: 11/253,193

(22) Filed: Oct. 18, 2005

(65) Prior Publication Data

US 2007/0086124 A1   Apr. 19, 2007

(51) Int. Cl.
H02H 3/16 (2006.01)

(52) U.S. Cl. .......................... 361/42; 361/44
(58) Field of Classification Search ................. 702/58; 361/42, 44
See application file for complete search history.

(56) References Cited

U.S. PATENT DOCUMENTS

| | | | |
|---|---|---|---|
| 5,224,006 A | | 6/1993 | MacKenzie et al. |
| 5,475,556 A | * | 12/1995 | Yoon et al. .................... 361/87 |
| 5,691,869 A | | 11/1997 | Engel et al. |
| 5,818,237 A | | 10/1998 | Zuercher et al. |
| 5,839,092 A | | 11/1998 | Erger et al. |
| 6,246,556 B1 | | 6/2001 | Haun et al. |
| 6,259,996 B1 | | 7/2001 | Haun et al. |
| 6,373,257 B1 | | 4/2002 | Macbeth et al. |
| 6,477,021 B1 | | 11/2002 | Haun et al. |
| 6,650,516 B2 | | 11/2003 | Langford et al. |
| 6,653,219 B2 | | 11/2003 | Fukuyama |
| 2002/0149891 A1 | | 10/2002 | Neiger et al. |
| 2003/0072113 A1 | * | 4/2003 | Wong et al. .................... 361/5 |
| 2003/0227290 A1 | | 12/2003 | Parker |
| 2004/0042137 A1 | | 3/2004 | Wong et al. |

FOREIGN PATENT DOCUMENTS

| EP | 1 003 262 A2 | 5/2000 |
|---|---|---|
| EP | 1 322 016 A2 | 6/2003 |

OTHER PUBLICATIONS

Microchip Technology Inc., "Save More Energy with PIC Microcontrollers featuring nanoWatt Technology", www.microchip.com/nanowatt, 2003, 2 pp.
IAEI News, "Five New Categories for AFCI Devices Under UL 1699", 2003, p. 94.
Underwriters Laboratories, "Arc Fault Circuit Interrupters—UL 1699", Dec. 2000, pp. 33, 34, 43-45.

* cited by examiner

Primary Examiner—Michael Sherry
Assistant Examiner—Lucy Thomas
(74) Attorney, Agent, or Firm—Martin J. Moran

(57) ABSTRACT

An arc fault circuit interrupter includes a line terminal, a load terminal, separable contacts electrically connected between the line terminal and the load terminal, and a current sensor structured to sense current associated with the load and flowing between the line terminal and the load terminal and through the separable contacts. The sensed current includes a plurality of line cycles. An arc fault detection circuit is structured to provide series arc protection and to generate a trip signal responsive to the sensed current from the current sensor. The arc fault detection circuit collects a plurality of samples of the sensed current over the line cycles, determines a single current transient associated with energization of the load, and responsively inhibits the series arc protection. An operating mechanism is structured to open the separable contacts responsive to the trip signal.

4 Claims, 9 Drawing Sheets

ARC FAULT CIRCUIT INTERRUPTER AND METHOD FOR DISABLING SERIES ARC PROTECTION DURING CURRENT TRANSIENTS

CROSS-REFERENCE TO RELATED APPLICATION

This application is related to commonly assigned:
U.S. patent application Ser. No. 10/895,158, filed Jul. 20, 2004, entitled "Arc Fault Circuit Interrupter".

BACKGROUND OF THE INVENTION

1. Field of the Invention

This invention relates generally to circuit interrupters and, more particularly, to circuit interrupters including an arc fault trip mechanism which responds to sputtering arc faults. The invention also relates to methods for providing series arc protection for electrical circuits.

2. Background Information

Arcing is a luminous discharge of electricity across an insulating medium, usually accompanied by the partial volatilization of electrodes. An arc fault is an unintentional arcing condition in an electrical circuit. Arc faults can be caused, for instance, by worn insulation between adjacent bared conductors, by exposed ends between broken conductors, by faulty electrical connections, and in other situations where conducting elements are in close proximity.

Arc faults in systems can be intermittent since the magnetic repulsion forces generated by the arc current force the conductors apart to extinguish the arc. Mechanical forces then bring the conductors together again in order that another arc is struck.

Circuit interrupters include, for example, circuit breakers, contactors, motor starters, motor controllers, other load controllers and receptacles having a trip mechanism. Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

Recently, there has been considerable interest in providing protection against arc faults. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

For example, an arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults (e.g., greater than 40 mA) and line-to-neutral faults (e.g., greater than 75 A); (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults (e.g., greater than 75 A) and line-to-neutral faults (e.g., 5 to 30 A, and greater than 75 A); (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

UL 1699 is a specification that governs the performance of AFCI products including branch/feeder type (AVZQ); outlet circuit type (AWCG); portable type (AWDO); cord type (AWAY); and combination type (AWAH) AFCIs. A carbonized path arc clearing time test is conducted in which the total clearing time before the AFCI trips shall not exceed specified arc test clearing times based upon different levels of test current (i.e., 5 A; 10 A; 15 A or 20 A; 22.5 A or 30 A). UL 1699 requires that the combination type AFCI must detect and interrupt the parallel combination of compressor and arc within a one-second clearing time for an arc test current of 5 A (resistive load).

UL 1699 specifies detection of series arcs only when loads on an associated electric distribution system are in steady-state operation.

The step application of a load voltage often results in significant load current transients. When a load is energized in an electrical power distribution system, there can be an initial transient current that decays into a periodic, stable current when the load reaches steady-state operation. In many cases, this is due to energy storage in the load, such as capacitive elements (which store energy in electric fields) or inductive elements (which store energy in magnetic fields). When a forcing function (e.g., a 60 Hz, 120 $V_{RMS}$ voltage source) is applied to a load, the load current exhibits a "natural" response which decays with the time constant(s) of the load, and a "forced" or "steady-state" response. The initial burst of increased current when the load is first energized performs the function of supplying stored energy required for the load to operate normally. For example, the initial transient of a computer load with a rectifier/capacitor input characteristic is due to capacitive energy storage, the initial transient of an electric motor is due to inductive energy storage, and the initial transient of a vacuum sweeper is due to inductive energy storage and the load's initial inertial energy storage.

Initial current transients may also result from load characteristics other than energy storage. One example of this is the impedance of an incandescent light, which varies greatly over the normal range of operating temperatures. When voltage is applied to incandescent lights at room temperature, the light-producing elements rapidly heat up to a steady-state temperature, which is accompanied by a significant increase in impedance and a consequent drop in current. An example of step voltage application 1A and current response 1B in incandescent lighting controlled by a dimmer (not shown) is shown in FIG. 1.

In contrast to the step application of load voltage, series arcs cause relatively minor variations in load voltage and current. For example, for a 60 Hz, 120 $V_{RMS}$ voltage source, when an arc occurs in series with a load, the sustained arc voltage can be about 20 to about 40 $V_{PEAK}$, depending on the conditions that create the arc. The arc voltage is subtracted from the source voltage, so that when an arc occurs, the voltage excitation at the load declines by about 10% to about 20%. The onset of series arcing is not accompanied by a load current transient like the type that accompanies a step application of voltage. Compared to current transients associated with applying a step voltage to a load, there is no dramatic change in the amplitude of the load currents. FIG. 2 shows series arc voltage 1C, load voltage 1D and load current 1E versus time for the onset of arcing in series with dimmer-controlled incandescent lighting (not shown) in which the arc is produced by using a carbon-copper arc generator (e.g., as specified by UL 1699, § 58.1.3) in series with the load.

As a result, step voltages (such as, for example, applying a voltage source to an unenergized load) can cause major variations in load current, while series arcs tend to cause only relatively minor variations in load current. Hence, any series arc detection algorithm must ignore major variations in load current and trip only on relatively minor variations in load current. It is believed that this conclusion flies in the face of conventional arc fault detection practice, particularly for parallel arc detection algorithms in which minor variations in load current are ignored and major variations in load current are considered the arc signatures of primary interest.

U.S. patent application Ser. No. 10/895,158 discloses that various arc fault algorithms clear a trip tally value whenever the load current exceeds a predetermined limit (e.g., 45 A; 30 $A_{RMS}$) for series arc protection (e.g., series arc protection is defined by UL 1699).

There is, therefore, room for improvement in arc fault circuit interrupters and methods for providing series arc protection.

SUMMARY OF THE INVENTION

These needs and others are met by the present invention, which mitigates nuisance trips by disabling series arc protection when current transients associated with load energization are detected. For example, this identifies current transients that exhibit a single high initial inrush, and temporarily disables series arc detection (and thereby nuisance tripping) until any such high initial inrush current transient has passed. A current inrush detector determines whether a current inrush has happened relatively recently. A current "chaos detector" determines how much the current has relatively recently exhibited major amplitude fluctuations. Based upon this information, series arc protection is enabled at appropriate times; that is, any time that no single current transient has recently occurred.

In accordance with one aspect of the invention, an arc fault circuit interrupter for an electrical circuit including a load comprises: a line terminal; a load terminal; separable contacts electrically connected between the line terminal and the load terminal; a current sensor structured to sense current associated with the load and flowing between the line terminal and the load terminal and through the separable contacts, the sensed current including a plurality of line cycles; at least one arc fault detection circuit structured to provide series arc protection and to generate a trip signal responsive to the sensed current from the current sensor, one of the at least one arc fault detection circuit being structured to collect a plurality of samples of the sensed current over the line cycles, determine a single current transient associated with energization of the load, and responsively inhibit the series arc protection; and an operating mechanism structured to open the separable contacts responsive to the trip signal.

The arc fault detection circuit may further be structured to determine the single current transient associated with initial energization or a single energization of the load, and responsively inhibit the series arc protection, and to determine plural current transients associated with energization of the load, and responsively enable or re-enable the series arc protection.

The arc fault detection circuit may further be structured to determine a first maximum value of the sensed current from one of the line cycles and a second maximum value of the sensed current from the subsequent one of the line cycles, determine if the difference between the first and second maximum values is greater than a first predetermined value and responsively set a first variable to a second predetermined value, and responsively increment a second variable by a third predetermined value.

The arc fault detection circuit may further be structured, for each of the line cycles, to determine if the first variable is zero, or if the first variable is greater than zero and the second variable is greater than the third predetermined value, and to responsively enable the series arc protection and, otherwise, responsively disable the series arc protection.

The arc fault detection circuit may further be structured, for each of the line cycles, to determine if the first variable is greater than zero and to responsively decrement the first variable.

The arc fault detection circuit may further be structured, for each of the line cycles, to determine if the second variable is greater than zero and to responsively decrement the second variable.

As another aspect of the invention, a method of enabling or disabling series arc protection for an electrical circuit including a load comprises: providing series arc protection for the electrical circuit; sensing current associated with the load and flowing in the electrical circuit, the sensed current including a plurality of line cycles; collecting a plurality of samples of the sensed current over the line cycles; and determining a single current transient associated with energization of the load, and responsively inhibiting the providing series arc protection.

The method may determine the single current transient associated with initial energization or a single energization of the load, and responsively inhibit the series arc protection; and determine plural current transients associated with energization of the load, and responsively enable or re-enable the series arc protection.

The method may further comprise determining a first maximum value of the sensed current from one of the line cycles and a second maximum value of the sensed current from the subsequent one of the line cycles; and determining the current transient if the difference between the first and second maximum values is greater than a predetermined value.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a single pole branch/feeder arc fault circuit interrupter (AFCI), although the invention is applicable to a wide range of AFCIs including one or more poles.

Figure 1:
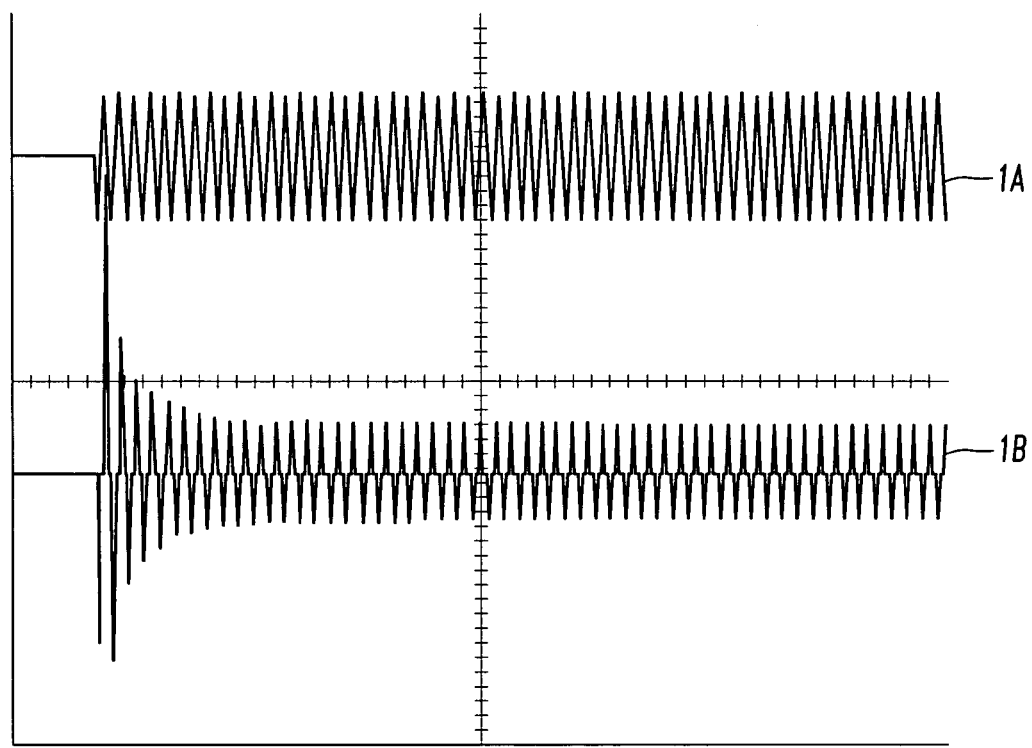
FIG. 1 is a plot of load voltage and load current versus time for the step application of an alternating current voltage source to dimmer-controlled incandescent lighting in which the initial current transient is due to load impedance variation with temperature.
Figure 2:
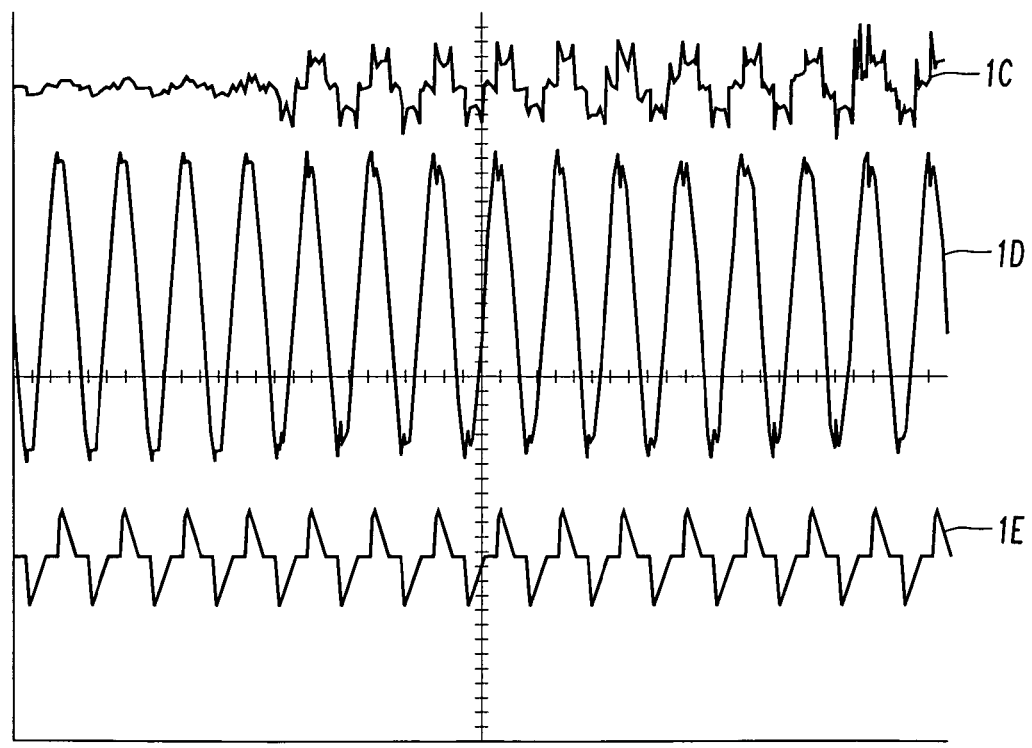
FIG. 2 is a plot of series arc voltage, load voltage and load current versus time for the onset of arcing in series with dimmer-controlled incandescent lighting.
Figure 3:
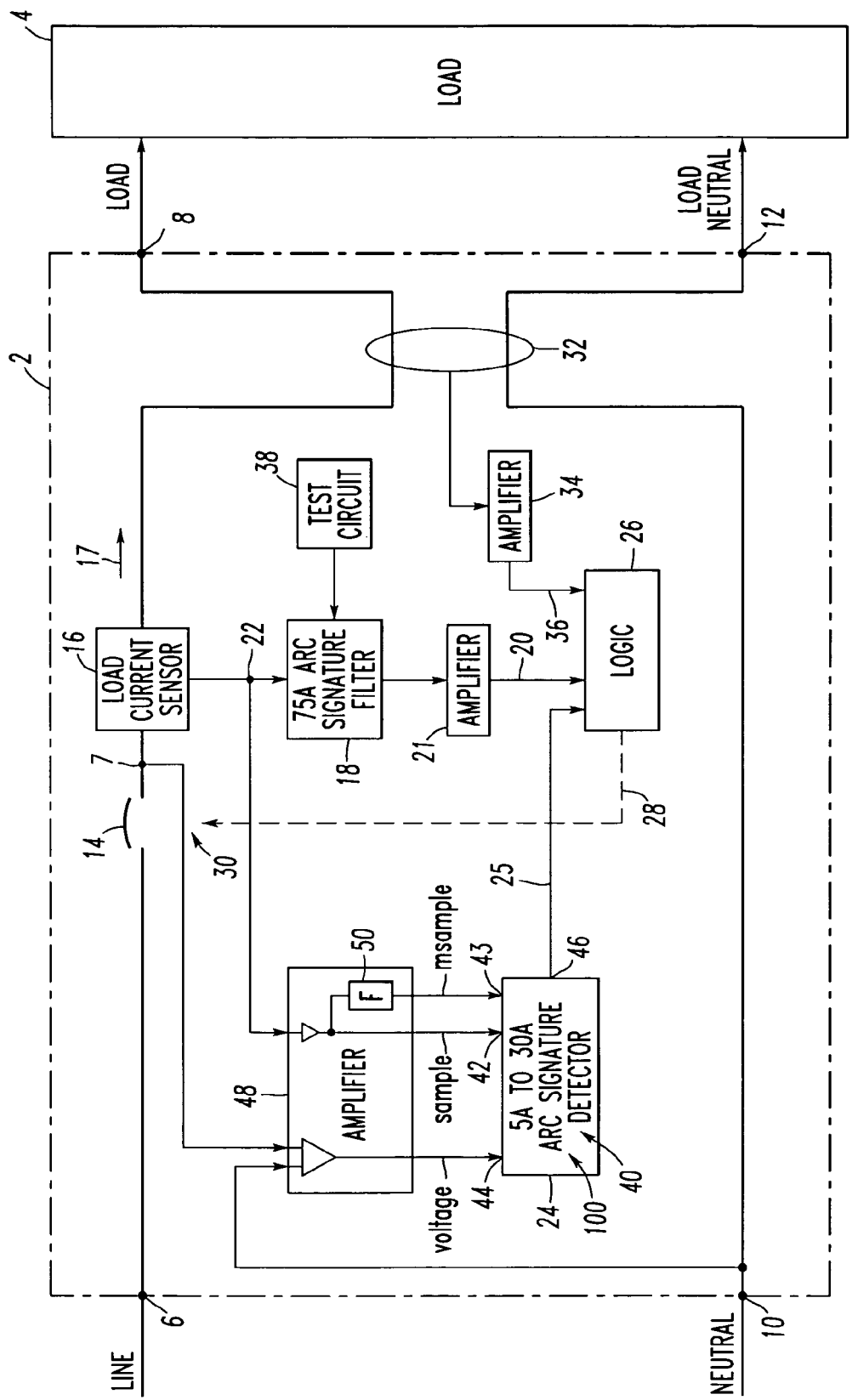
FIG. 3 is a block diagram of a single pole branch/feeder arc fault circuit interrupter in accordance with the present invention.

Referring to FIG. 3, an arc fault circuit interrupter, such as circuit breaker 2, is for an electrical circuit associated with one of a plurality of different types of loads, such as load 4. The circuit breaker 2 includes a line terminal 6 and a load terminal 8. If the circuit breaker is optionally structured to provide ground fault protection, then it also includes a neutral terminal 10 and a load neutral terminal 12. As is conventional, separable contacts 14 are electrically connected between the line terminal 6 and the load terminal 8. A load current sensor 16 is structured to sense current 17 flowing between the line and load terminals 6, 8 and through the separable contacts 14. Here, the current 17 is associated with one of the different types of loads and includes a plurality of alternating current line cycles. As is also conventional, a first arc fault detection circuit 18 (e.g., a 75 A arc signature filter) is structured to generate a first trip signal 20 through amplifier 21 responsive to the sensed current 22 from the current sensor 16. Suitable arc fault detection circuits, such as the circuit 18, are disclosed, for example, in U.S. Pat. Nos. 5,224,006; 5,691,869; and 5,818,237, which are hereby incorporated by reference herein.

In accordance with the present invention, a second arc fault detection circuit 24 (e.g., 5 A to 30 A arc signature detector) is structured to collect a plurality of samples of the sensed current 22 for a current one of the line cycles and a plurality of samples of the sensed current 22 for one of the line cycles prior to the current one of the line cycles, and to determine a total current value from a peak current of the samples of the sensed current for the current one of the line cycles. Although not required, the circuit 24 may preferably employ the total current value and some of the samples to determine the one of the types of loads, and may generate a second trip signal 25 responsive to the sensed current 22 and the determined one of the types of loads. A trip circuit 26 is structured to generate a third trip signal 28 responsive to the first and second trip signals 20, 25. An operating mechanism 30 is structured to open the separable contacts 14 responsive to the third trip signal 28.

Although not required, the circuit breaker 2 may include a ground fault current sensor 32 (e.g., personnel protection; equipment protection; 30 mA) and a corresponding amplifier 34, which generates a ground fault trip signal 36 to the trip circuit 26. As is also not required, the first arc fault detection circuit 18 includes a suitable test circuit 38, which generates the first trip signal 20 in response to a user request.

The second arc fault detection circuit 24 may be, for example, a suitable PIC® model microprocessor (µP) as marketed by Microchip Technology Inc. of Chandler, Ariz., including, for example, internal memory for a suitable firmware routine 40, plural analog inputs, such as 42, 43, 44, and plural I/O lines, such as output 46. Upstream of the second arc fault detection circuit 24 is a suitable amplifier circuit 48, which buffers the analog sensed current 22 from the load current sensor 16 to the first analog input 42 (sample), which buffers and filters the analog sensed current 22 from the load current sensor 16 to the second analog input 43 (msample), and which buffers the switched line voltage 7 from the load side of the separable contacts 14 to the third analog input 44 (voltage). Preferably, the amplifier circuit 48 includes a filter circuit (F) 50, which is a low pass circuit having a cutoff frequency of about 1 kHz for the second analog input 43.

Figure 4A:
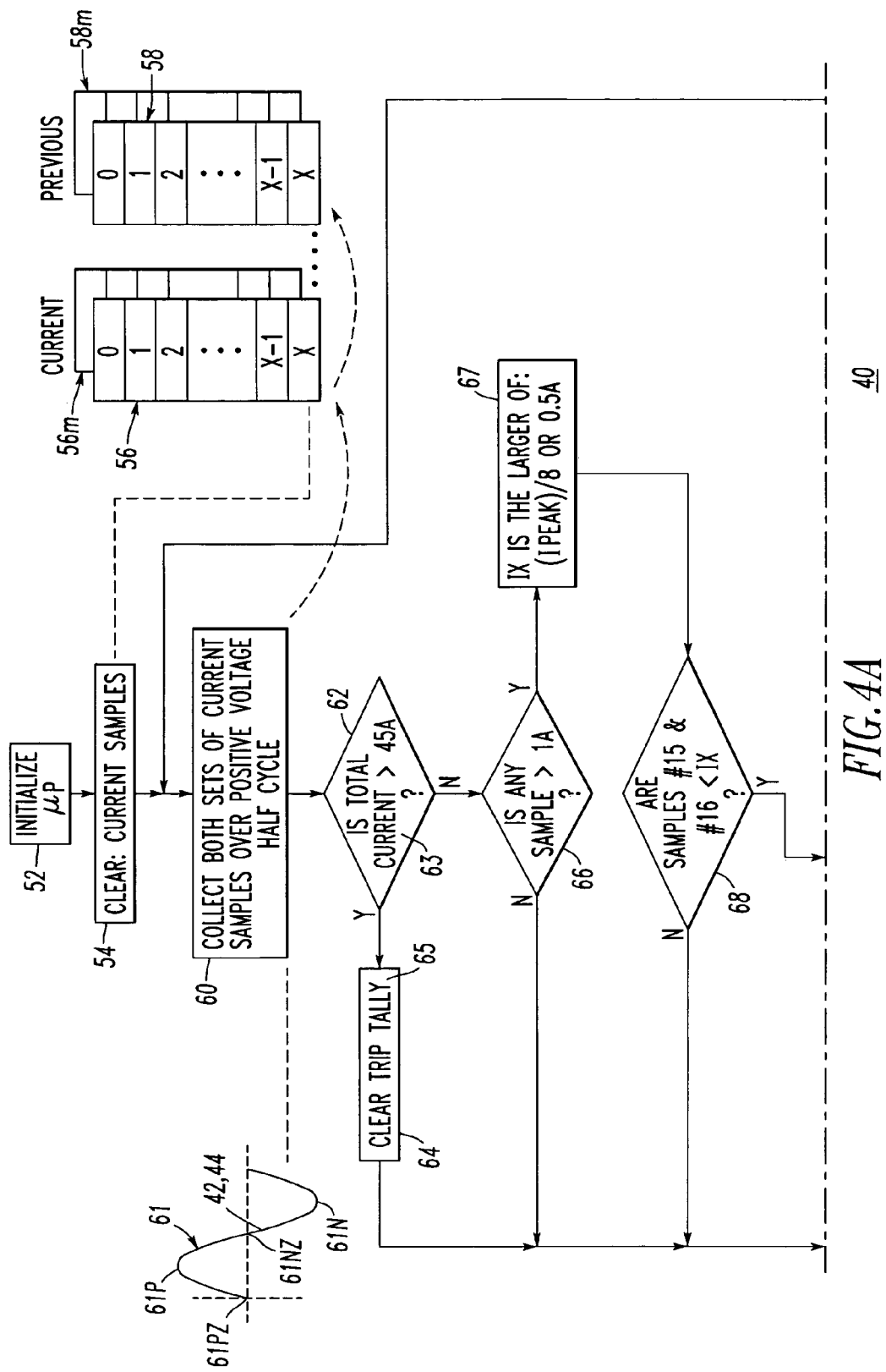
FIGS. 4A-4B form a flowchart of a current sampling routine to collect current samples for the processor of FIG. 3.
Figure 4B:
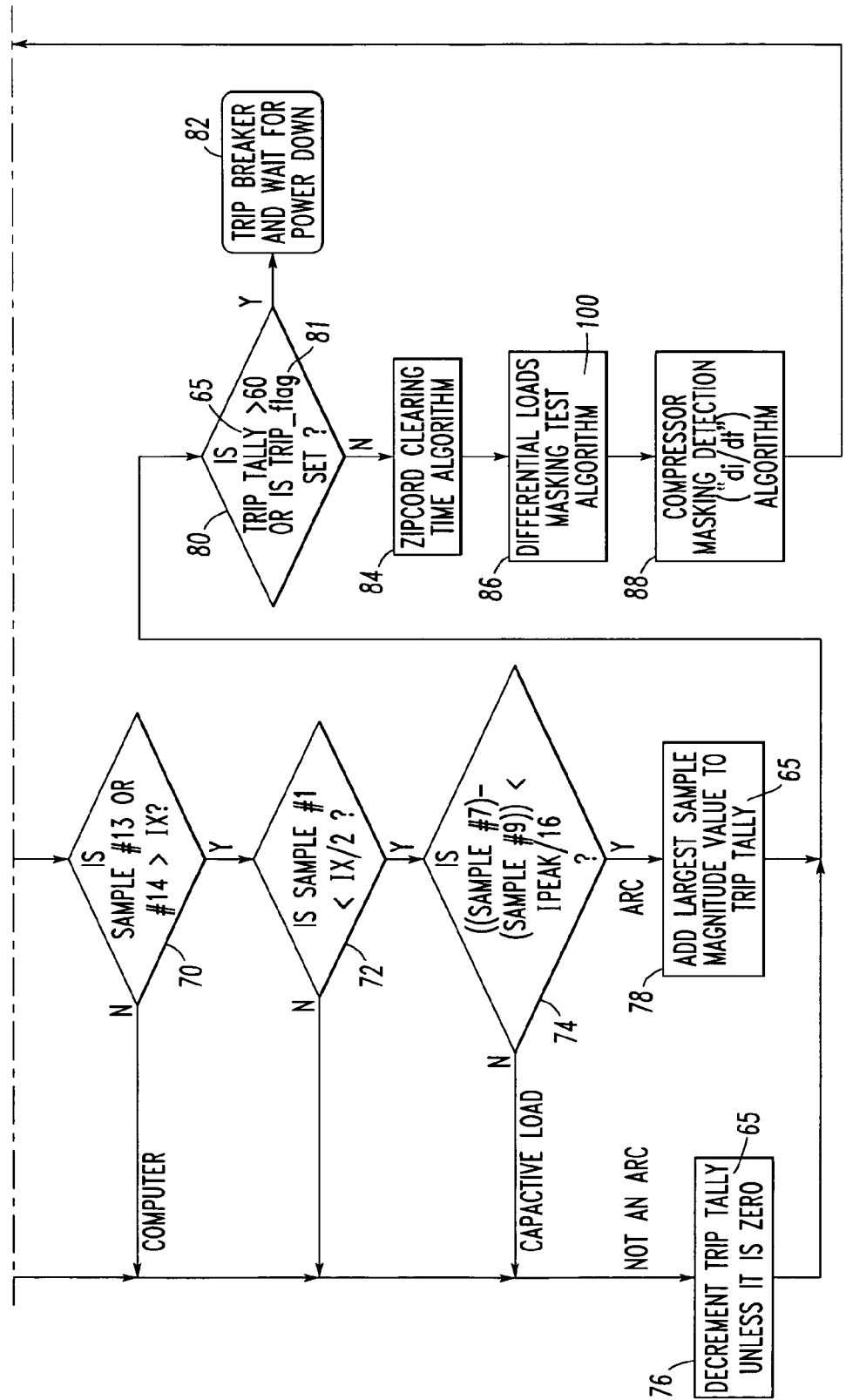

FIGS. 4A-4B show the clearing time algorithm 40 for the processor 24 of FIG. 3. This algorithm 40 is suitable for arc faults resulting from opposing electrodes (not shown) of a carbonized path arc clearing time test. First, at 52, the algorithm 40 initializes the processor 24 of FIG. 3, before it clears, at 54, current sample arrays 56, 56m, 58, 58m. Next, at 60, the algorithm 40 copies the values from the current arrays 56, 56m to the previous arrays 58, 58m, respectively. Then, the algorithm 40 collects the two current sets of the current samples in the arrays 56 (sample), 56m (msample) from the respective analog inputs 42, 43 of FIG. 3. In this example, a count (e.g., x+1) of the samples of the sensed current for a current one of the line cycles is about 19 (e.g., sample #0 (or sample (0)) through and including sample #18 (or sample (18)). The line cycles, such as 61, include a positive halfcycle 61P and a negative half cycle 61N. Preferably, the algorithm 40 collects the samples of the sensed current for the current one of the line cycles substantially during the positive half cycle 61P and during the start of the negative half cycle 61N, and processes the samples of the sensed current for the current one of the line cycles, in order to generate the second trip signal 25 (FIG. 3) during the negative half cycle 61N. In this example, the line voltage and the sensed current are in phase, and the algorithm 40 collects about 19 of the samples of the sensed current for the current one of the line cycles at a rate of about 32 samples per line cycle. Alternatively, the sensed current may lead or lag the line voltage. The algorithm 40 collects a first one of the samples (sample #0) of the sensed current at about the positive zero crossing 61PZ of the line cycle of the line voltage, as sensed from analog input 44 (voltage) (FIG. 3). For example, the processor 24 employs an edge-triggered interrupt (not shown) that responds to the positive zero crossing 61PZ.

For example, if N is an integer, such as 8, then the algorithm 40 collects about 2N plus three (=19) of the samples of the sensed current for the current one of the line cycles. The algorithm 40 collects an (N+1)th one (e.g., 9th) (e.g., sample #8) of the samples of the sensed current at about the positive peak of the positive half cycle 61P of the line voltage. The capacitive di/dt is maximum (positive) at the line voltage positive peak, while resistive di/dt is zero. The algorithm collects a (2N+1)th one (e.g. 17th) (e.g., sample #16) of the samples of the sensed current at about the negative zero crossing 61NZ of the line cycle of the line voltage. In this example, two additional samples (e.g., sample #17 and sample #18) are collected during the negative half cycle 61N.

Although the processor 24 of FIG. 3 inputs, converts and stores the values substantially during the positive half cycle 61P plus a relatively small portion of negative half cycle 61N, with subsequent processing in the subsequent portion of negative half cycle 61N, this could be reversed. The processor 24 provides a suitable analog-to-digital conversion (e.g., without limitation, about 7 counts per ampere) of the sensed current values 22 (FIG. 3) to the digital values in the arrays, such as 56.

Next, at 62, the algorithm 40 determines a total current value (Ipeak) 63, which is the peak or maximum current of the first seventeen values of the current array 56. If the total current value is greater than 45 A, then, at 64, a trip tally 65 is cleared, since the current samples in the array 56 do not represent a low level arc. After step 64, execution resumes at 76. Otherwise, if the total current value is less than 45 A, then execution resumes with the test at 66. If any of the tests at even steps 66-74 fail, then, again, the current samples in the array 56 do not represent an arc and execution resumes at 76. However, if all of the tests at even steps 66-74 pass, then the current samples in the array 56 do represent an arc and execution resumes at 78.

At 66, it is determined if any of the first seventeen current samples in the current array 56 are greater than 1 A. If so, then at 67, a value, Ix, is determined to be the larger of Ipeak/8 or 0.5 A. Next, at 68, it is determined if the sixteenth and seventeenth samples in the current array 56 are both less than Ix. If so, then at 70, it is determined if either the fourteenth or the fifteenth samples in the current array 56 are greater than Ix. If not, then the load is a computer; but, if so, then at 72, it is determined if the second sample in the current array 56 is less than one half of Ix. If so, then at 74, it is determined if the eighth sample less the tenth sample in the current array 56 is less than one sixteenth of Ipeak. If not, then there is a capacitive load. On the other hand, since all of even tests 66-74 have passed, then the load is an arc and execution resumes at 78.

If there was no arc, then step 76 decrements the trip tally 65 by one, unless such trip tally was already zero. Hence, the trip tally 65 is greater than or equal to zero. Otherwise, if there was an arc, then, step 78 adds the total current value (Ipeak) 63, which is the peak or maximum current of the first seventeen values of the current array 56, to the trip tally 65.

After either of the steps 76,78, at 80, it is determined if the trip tally 65 is greater than a suitable threshold (e.g., 60) or if a TRIP_flag 81 (routine 86) was set. If so, then, at 82, the circuit breaker 2 of FIG. 3 is tripped by asserting the second trip signal 25 (FIG. 3), after which the processor 24 awaits power down, since the separable contacts 14 (FIG. 3) and the source of power (not shown) therefrom is to be removed. On the other hand, if the trip tally 65 is not greater than its threshold (e.g., 60) and if the TRIP_flag 81 was not set, then three routines 84, 86 and 88 are sequentially executed before execution resumes at 60. Routine 84 provides a zip cord clearing time algorithm. Routine 86 provides a differential loads masking test. Routine 88 provides a compressor masking detection (di/dt) algorithm.

Figure 12:
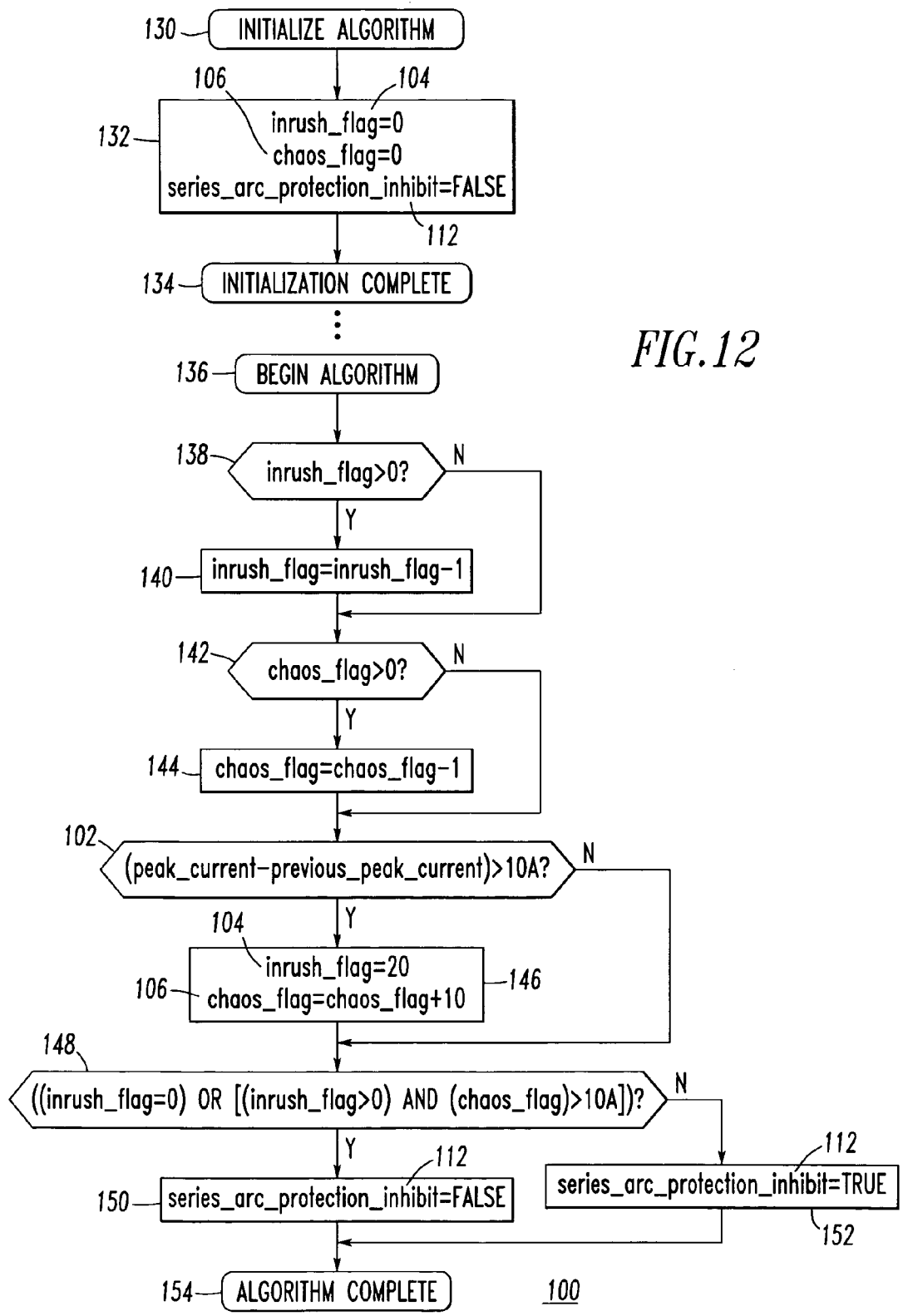
FIG. 12 is a flowchart of an algorithm to disable series arc protection when current transients associated with load energization are detected for the arc fault circuit interrupter of FIG. 3.

Referring to FIG. 12, a routine 100 to enable or disable series arc protection is executed by the processor 24 of FIG. 3. A current inrush detector 102 looks for a suitable predetermined (e.g., without limitation, a 10 $A_{PEAK}$) increase of the sensed current in the array 56 (sample) from cycle to cycle. If such an increase occurs, then a current inrush detector flag (inrush_flag) 104 is set to a predetermined count (e.g., without limitation, 20) and a chaos detector flag (chaos_flag) 106 is incremented by a predetermined count (e.g., without limitation, 10). As will be discussed, the routine 100 decrements these counts once per cycle until they respectively reach a value of zero. By employing, for example, about a 10 $A_{PEAK}$ increase in peak current, the current inrush detector 102 and the current chaos detector are fairly immune to changes in current resulting from series arcs, which typically cause amplitude variations that are much less.

For example, during a given cycle, if the current inrush detector flag 104 is zero, then the load current is considered to be in steady-state and, hence, series arc fault detection is enabled. However, if the current inrush detector flag 104 is nonzero and the current chaos detector flag 106 is less than, for example, about 10, then a single current transient is assumed to have occurred and the series arc fault detection is disabled. Also, if the current inrush detector flag 104 is nonzero and the current chaos detector flag 106 is greater than, for example, about 10, then multiple current transients are assumed to have occurred. Since the load current might be indicative of a dangerous condition, series arc fault detection is enabled.

The routine 100 and the various arc fault algorithms disclosed by U.S. patent application Ser. No. 10/895,158 may preferably work in tandem to prevent nuisance tripping whenever there are relatively high inrush current transients.

Figure 5:
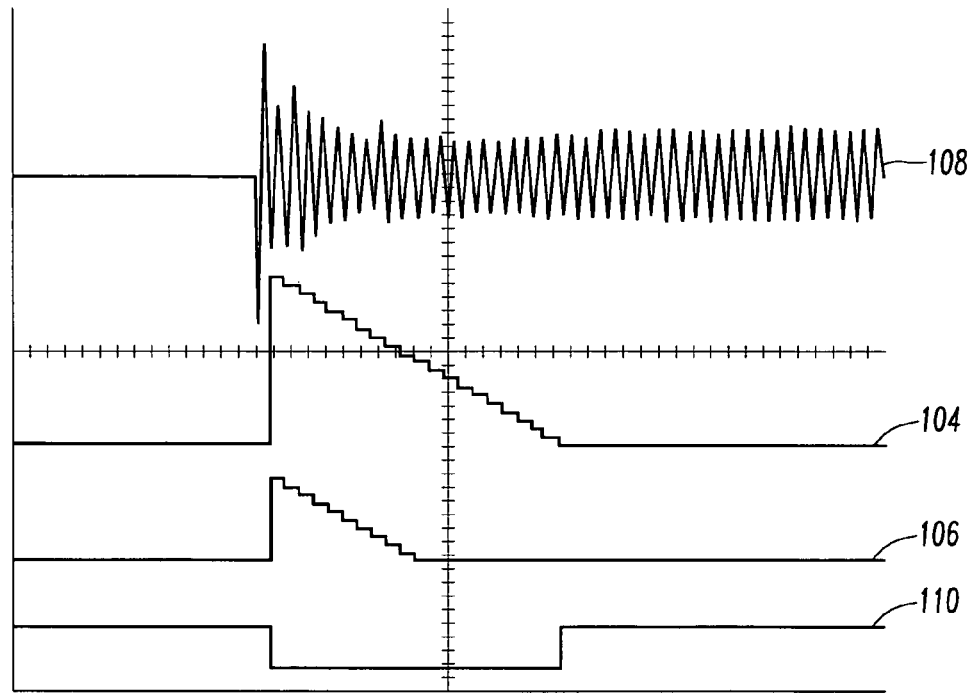
FIG. 5 is a plot of load current, a current inrush detector flag, a current chaos detector flag and a series arc protection enable flag for current inrush detector operation for the arc fault circuit interrupter of FIG. 3.

The operation of the routine 100 is shown, by example, for a step application of an individual load in parallel with a steady-state load. The routine 100 detects a current transient and disables series arc detection as will be discussed further in connection with FIG. 12. FIG. 5 shows operation of the routine 100 during a step application of an example 60 Hz, 120 V voltage source to a computer (not shown) with rectifier/capacitor input characteristics. FIG. 5 plots the resulting load current 108, the current inrush detector flag 104, the current chaos detector flag 106 and a series arc protection enable flag 110 (which is the logical inversion of the series_arc_protection_inhibit signal 112 of FIG. 12) versus time for current inrush detector operation of the arc fault circuit interrupter 2 of FIG. 3. Here, there is one example chaos event after which the current chaos detector flag 106 returns to zero after 10 cycles, and the current inrush detector flag 104 returns to zero after 20 cycles during which time series arc protection is not enabled.

Figure 6:
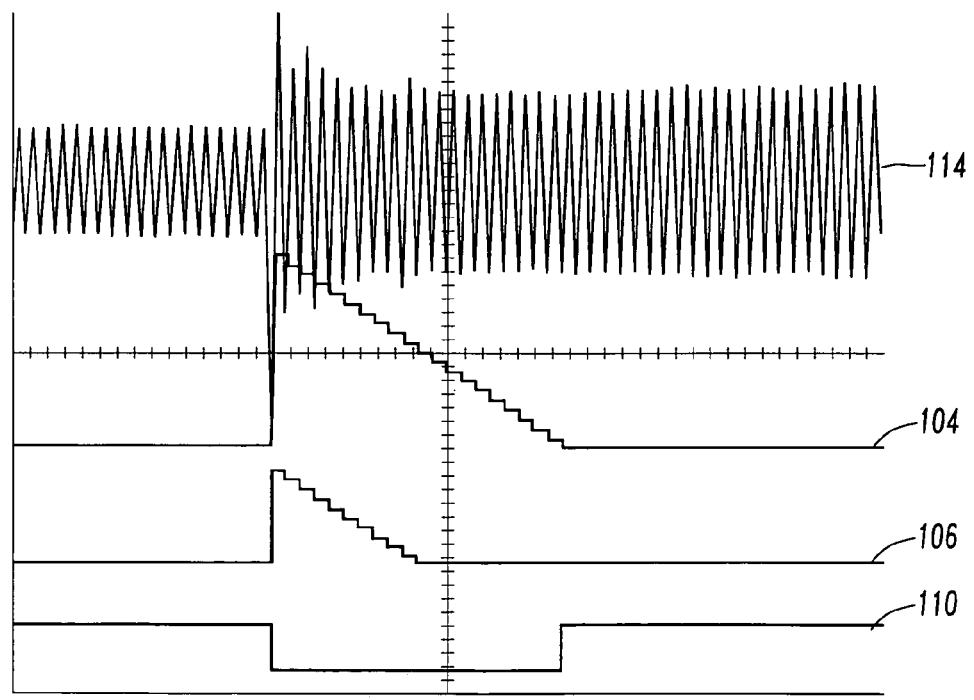
FIG. 6 is a plot of 10 $A_{RMS}$ resistive load current in parallel with step application of a computer with rectifier/capacitor input characteristics, the current inrush detector flag, the current chaos detector flag and the series arc protection enable flag for current inrush detector operation for the arc fault circuit interrupter of FIG. 3.
Figure 7:
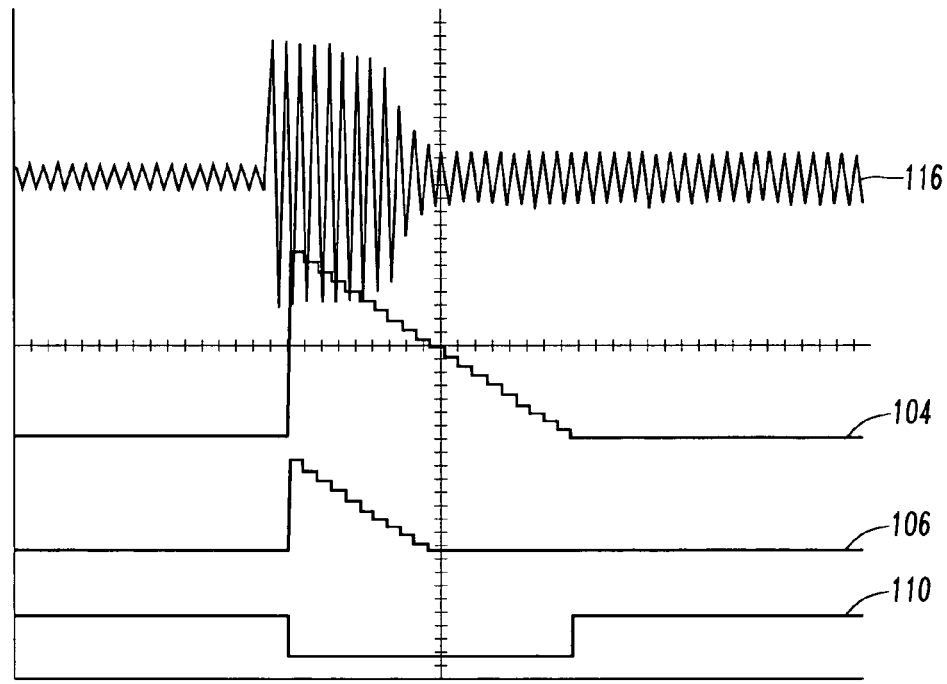
FIG. 7 is a plot of 5 $A_{RMS}$ resistive load current in parallel with step application of a ¾ HP electric motor with no mechanical load, the current inrush detector flag, the current chaos detector flag and the series arc protection enable flag for current inrush detector operation for the arc fault circuit interrupter of FIG. 3.
Figure 8:
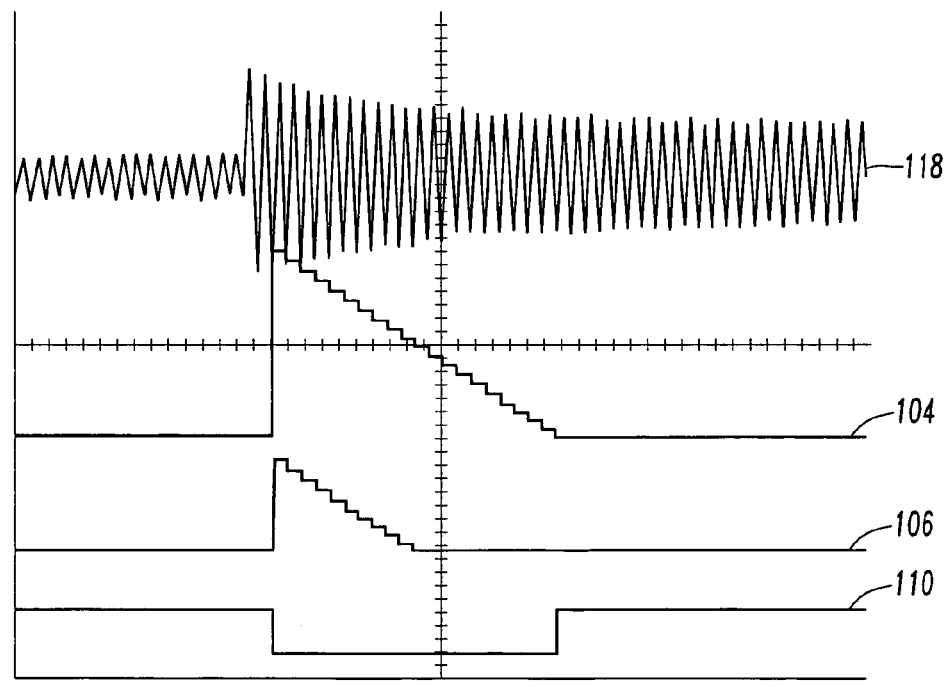
FIG. 8 is a plot of 1000 W dimmer-controlled incandescent lighting in parallel with step application of a vacuum sweeper, the current inrush detector flag, the current chaos detector flag and the series arc protection enable flag for current inrush detector operation for the arc fault circuit interrupter of FIG. 3.

In FIGS. 6-8, the operation of the routine 100 of FIG. 12 is presented by a number of example step applications of individual loads in parallel with steady-state loads, which result in load currents 114 (10 $A_{RMS}$ resistive load in parallel with step application of computers with rectifier/capacitor input characteristics), 116 (5 $A_{RMS}$ resistive load in parallel with step application of ¾ HP electric motor with no mechanical load), 118 (1000 W of dimmer-controlled incandescent lighting in parallel with step application of a vacuum sweeper), respectively. In each case, the routine 100 detects one current transient and disables series arc detection. These examples are important for practical situations, for example, where it is typical for a single (e.g., 15 A or 20 A) circuit breaker to supply several different loads, any of which may turn on at any given time.

Figure 9:
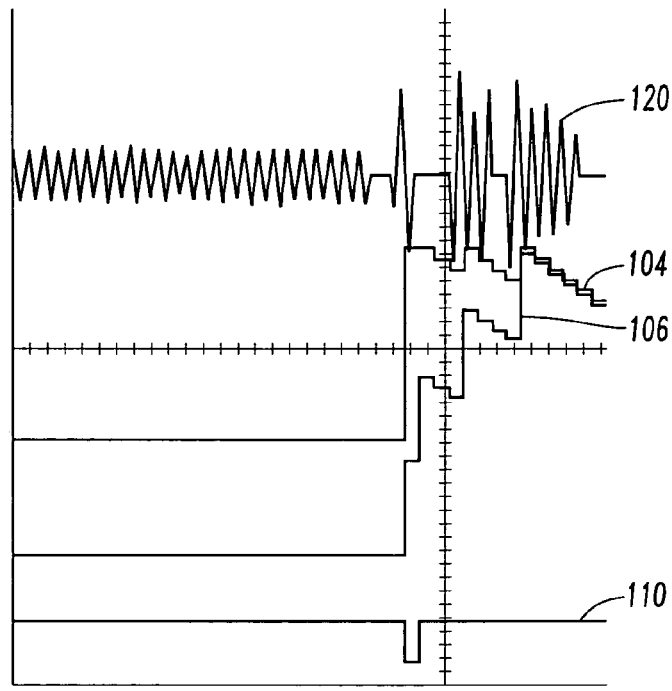
FIG. 9 is a plot of a load current for a compressor experiencing series arcing, the current inrush detector flag, the current chaos detector flag and the series arc protection enable flag for current inrush detector operation for the arc fault circuit interrupter of FIG. 3.
Figure 10:
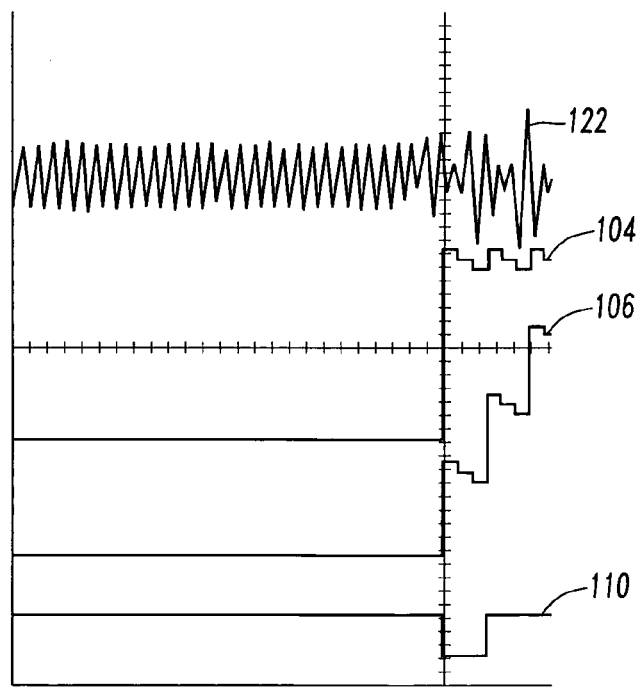
FIG. 10 is a plot of a load current for a 5 $A_{RMS}$ resistive load, with no arcing, in parallel with a compressor experiencing series arcing, the current inrush detector flag, the current chaos detector flag and the series arc protection enable flag for current inrush detector operation for the arc fault circuit interrupter of FIG. 3.
Figure 11:
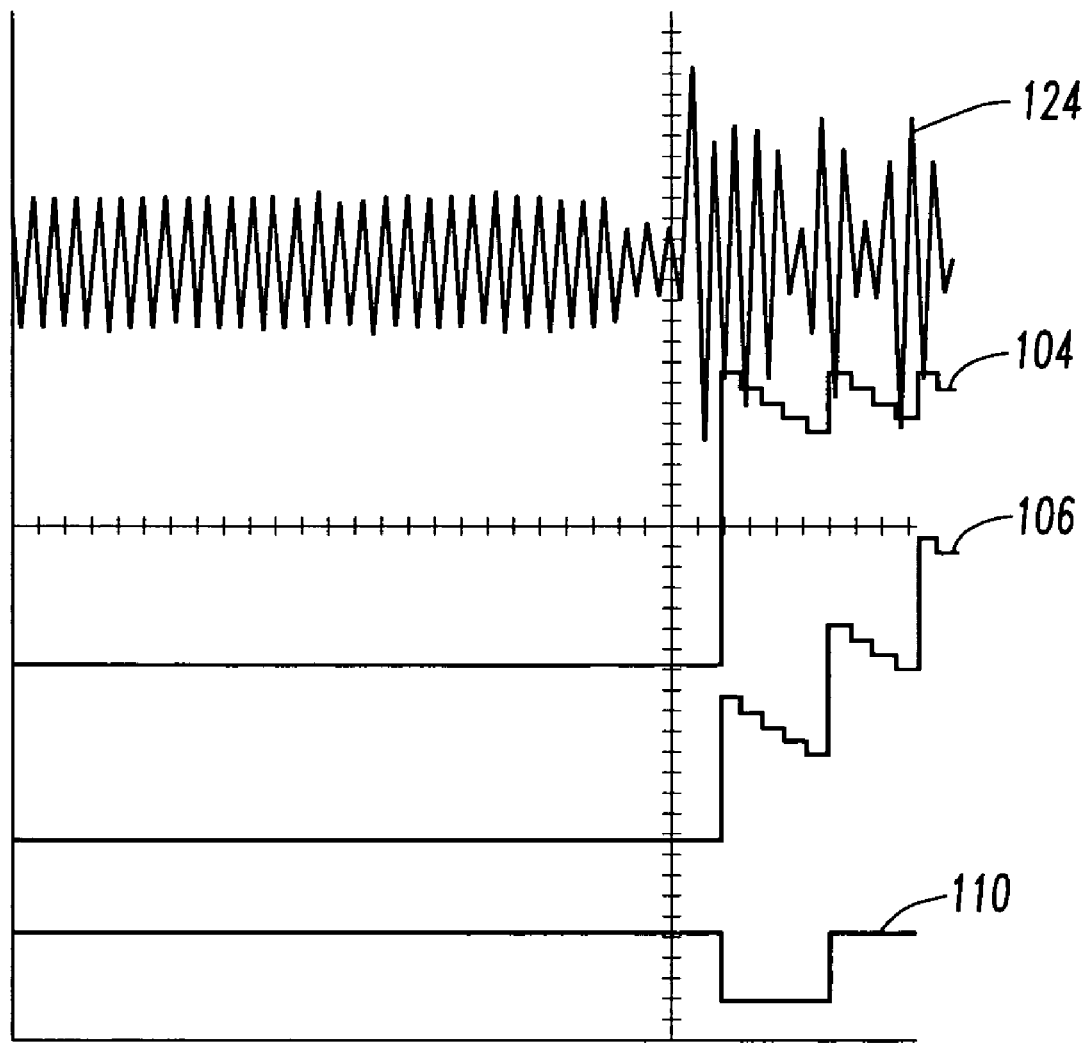
FIG. 11 is a plot of a load current for 1000 W dimmer-controlled incandescent lighting, with no arcing, in parallel with a compressor experiencing series arcing, the current inrush detector flag, the current chaos detector flag and the series arc protection enable flag for current inrush detector operation for the arc fault circuit interrupter of FIG. 3.

In FIGS. 9-11, the operation of the routine 100 of FIG. 12 is presented, by example, for a number of compressor loads in parallel with steady-state loads, which result in load currents 120 (compressor experiencing series arcing), 122 (5 $A_{RMS}$ resistive load with no arcing, in parallel with a compressor experiencing series arcing), 124 (1000 W of dimmer-controlled incandescent lighting with no arcing, in parallel with a compressor experiencing series arcing), respectively. Generally, when an arc occurs in series with a compressor, the compressor current alternately quenches and re-strikes several times. Each time a re-strike occurs, the compressor draws a relatively high inrush current that rapidly decays. However, it is important to ensure that the routine 100 does not disable series arc detection following each re-strike. Thus, if several current transients occur within a relatively short interval of time, the routine 100 re-enables series arc detection.

Returning to FIG. 12, initialization of the routine 100 (which is executed at startup prior to the routine 100) occurs at even steps 130-134. The routine 100, beginning at 136, is executed once per electrical line cycle. Step voltages (e.g., applying a 60 Hz 120 $V_{RMS}$ source to a load) can cause major variations in load current, although series arcs tend to cause only minor variations in load current. The routine 100 detects variations in load current based on sudden load current increases and inhibits series arc protection (and thereby nuisance tripping) until the load has reached steady-state. However, if several load current increases occur in rapid succession, then the routine 100 re-enables series arc protection.

During initialization of the routine 100, the inrush_flag 104 and the chaos_flag 106 are both set to zero, and the series_arc_protection_inhibit 112 signal is set false. During the routine 100, after beginning at 136, it is determined, at 138, if the inrush_flag 104 is greater than zero. If so, then the inrush_flag 104 is decremented at 140. Otherwise, or after 140, it is determined if the chaos_flag 106 is greater than zero at 142. If so, then the chaos_flag 106 is decremented at 144. Otherwise, or after 142, it is determined if the difference between the peak_current (Ipeak 63 from the array 56) and the previous_peak_current (from the array 58) is greater than a predetermined value (e.g., without limitation, 10 A). If so, then, at 146, the inrush_flag 104 is set to a first predetermined value (e.g., without limitation, 20) and the chaos_flag 106 is incremented by a second predetermined value (e.g., without limitation, 10). Otherwise, or after 146, at 148, it is determined if the inrush_flag 104 is zero, or if the inrush_flag 104 is greater than zero and the chaos_flag 106 is greater than 10. If so, then at 150, series arc protection is enabled by setting false series_arc_protection_inhibit 112. On the other hand, if the test at 148 is false, then at 152, series arc protection is disabled by setting true series_arc_protection_inhibit 112. After either 150 or 152, the routine 100 completes, at 154, for the current line cycle until it re-starts, at 136, for the next line cycle.

Step voltages (such as, for example, applying a 60 Hz, 120 $V_{RMS}$ source to a load) can cause major variations in load current, while series arcs tend to cause only minor variations in load current. The disclosed routine 100 detects variations in load current based on sudden load current increases and inhibits series arc protection (and thereby nuisance tripping) until the load has reached steady-state. However, if several (e.g., without limitation, two or more) load current increases occur in relatively rapid succession, then the routine 100 re-enables series arc protection.

Although the example arc fault detection circuit 24 employs a microprocessor, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter for an electrical circuit including a load, said arc fault circuit interrupter comprising:

a line terminal;

a load terminal;

separable contacts electrically connected between said line terminal and said load terminal;

a current sensor structured to sense current associated with said load and flowing between said line terminal and said load terminal and through said separable contacts, said sensed current including a plurality of line cycles;

at least one arc fault detection circuit structured to provide series arc protection and to generate a trip signal responsive to said sensed current from said current sensor, one of said at least one arc fault detection circuit being structured to collect a plurality of samples of said sensed current over said line cycles, determine a single current transient associated with energization of said load, and responsively inhibit said series arc protection;

an operating mechanism structured to open said separable contacts responsive to said trip signal;

wherein said one of said at least one arc fault detection circuit is further structured to determine a first maximum value of said sensed current from one of said line cycles and a second maximum value of said sensed current from the subsequent one of said line cycles, determine if the difference between said first and second maximum values is greater than a first predetermined value and responsively set a first variable to a second predetermined value, and responsively increment a second variable by a third predetermined value; and wherein said one of said at least one arc fault detection circuit is further structured, for each of said line cycles, to determine if the first variable is greater than zero and to responsively decrement said first variable by a predetermined value.

2. An arc fault circuit interrupter for an electrical circuit including a load, said arc fault circuit interrupter comprising:

a line terminal;

a load terminal;

separable contacts electrically connected between said line terminal and said load terminal;

a current sensor structured to sense current associated with said load and flowing between said line terminal and said load terminal and through said separable contacts, said sensed current including a plurality of line cycles;

at least one arc fault detection circuit structured to provide series arc protection and to generate a trip signal responsive to said sensed current from said current sensor, one of said at least one arc fault detection circuit being structured to collect a plurality of samples of said sensed current over said line cycles, determine a single current transient associated with energization of said load, and responsively inhibit said series arc protection;

an operating mechanism structured to open said separable contacts responsive to said trip signal;

wherein said one of said at least one arc fault detection circuit is further structured to determine a first maximum value of said sensed current from one of said line cycles and a second maximum value of said sensed current from the subsequent one of said line cycles, determine if the difference between said first and second maximum values is greater than a first predetermined value and responsively set a first variable to a second predetermined value, and responsively increment a second variable by a third predetermined value; and wherein said one of said at least one arc fault detection circuit is further structured, for each of said line cycles, to determine if the second variable is greater than zero and to responsively decrement said second variable by a predetermined value.

3. A method of enabling or disabling series arc protection for an electrical circuit including a load, said method comprising:

providing series arc protection for said electrical circuit;

sensing current associated with said load and flowing in said electrical circuit, said sensed current including a plurality of line cycles;

collecting a plurality of samples of said sensed current over said line cycles;

determining a single current transient associated with energization of said load, responsively inhibiting said providing series arc protection;

further comprising determining a first maximum value of said sensed current from one of said line cycles and a second maximum value of said sensed current from the subsequent one of said line cycles;

determining if the difference between said first and second maximum values is greater than a first predetermined value and responsively setting a first variable to a second predetermined value, and responsively incrementing a second variable by a third predetermined value; and further comprising for each of said line cycles, determining if the first variable is greater than zero and responsively decrementing said first variable by a predetermined value.

4. A method of enabling or disabling series arc protection for an electrical circuit including a load, said method comprising:

providing series arc protection for said electrical circuit;

sensing current associated with said load and flowing in said electrical circuit, said sensed current including a plurality of line cycles;

collecting a plurality of samples of said sensed current over said line cycles;

determining a single current transient associated with energization of said load, responsively inhibiting said providing series arc protection;

further comprising determining a first maximum value of said sensed current from one of said line cycles and a second maximum value of said sensed current from the subsequent one of said line cycles;

determining if the difference between said first and second maximum values is greater than a first predetermined value and responsively setting a first variable to a second predetermined value, and responsively incrementing a second variable by a third predetermined value; and further comprising for each of said line cycles, determining if the second variable is greater than zero and responsively decrementing said second variable by a predetermined value.

* * * * *